Dec. 6, 1955 E. L. McCARTHY 2,725,786

OPTICAL CARD READING APPARATUS

Filed Feb. 11, 1954

2 Sheets-Sheet 1

INVENTOR
Edward L. McCarthy
BY
Pennie Edmonds Morton Barrows & Taylor
ATTORNEYS

Dec. 6, 1955 E. L. McCARTHY 2,725,786

OPTICAL CARD READING APPARATUS

Filed Feb. 11, 1954 2 Sheets-Sheet 2

INVENTOR
Edward L. McCarthy
BY
Pennie Edmonds Morton Barrows & Taylor
ATTORNEYS

United States Patent Office 2,725,786

Patented Dec. 6, 1955

2,725,786

OPTICAL CARD READING APPARATUS

Edward L. McCarthy, Glenbrook, Conn., assignor to The Perkin-Elmer Corporation, Norwalk, Conn., a corporation of New York Application February 11, 1954, Serial No. 409,593

6 Claims. (Cl. 88—24)

This invention relates to apparatus which facilitates reading or interpreting data carried on cards and indicated by holes punched in the cards at appropriate locations. More particularly, the invention is concerned with a device, by which the data represented by the holes in such a card may be optically converted or translated into visible characters on a viewing surface. The new device is intended to be used with cards, on which the areas carrying data are arranged in vertical rows and only one hole is punched at a spot in a particular vertical row. When such a punched data card is placed in the device, characters corresponding to the data represented by the holes in the card appear on the viewing surface in a single horizontal row and can be quickly read, whereas direct examination of the card to obtain the data would be slow and subject to errors.

The new device comprises essentially a source of light, a plate having characters occupying the same relative positions on the plate as the data areas on the card to be read and denoting data on such areas, and an optical system for receiving light through the plate and imaging the characters in a horizontal row upon a viewing surface, which may be a translucent surface such as a ground glass plate or screen. The optical system includes a lens, which, if acting alone, would produce an array of images on the screen corresponding to the array of characters on the plate. With this lens is employed a reflecting device, which acts on beams of light from characters lying in horizontal rows above and below the axis of the lens and causes the images of such characters to appear in a horizontal row on the screen. The reflecting device comprises a pair of parallel horizontal reflecting surfaces lying above and below the lens axis and the surfaces reflect beams from off-axis characters one or more times, depending on the positions of the characters in relation to the axis. The characters are, accordingly, of two classes, namely, inverted and reversed, depending on whether the beams therefrom in traveling from the lens to the screen undergo no reflection or an even number of reflections in one case, or an odd number of reflections in the other.

For a better understanding of the invention, reference may be made to the accompanying drawings, in which Fig. 1 is a view in perspective of the new device;

Figure 1:
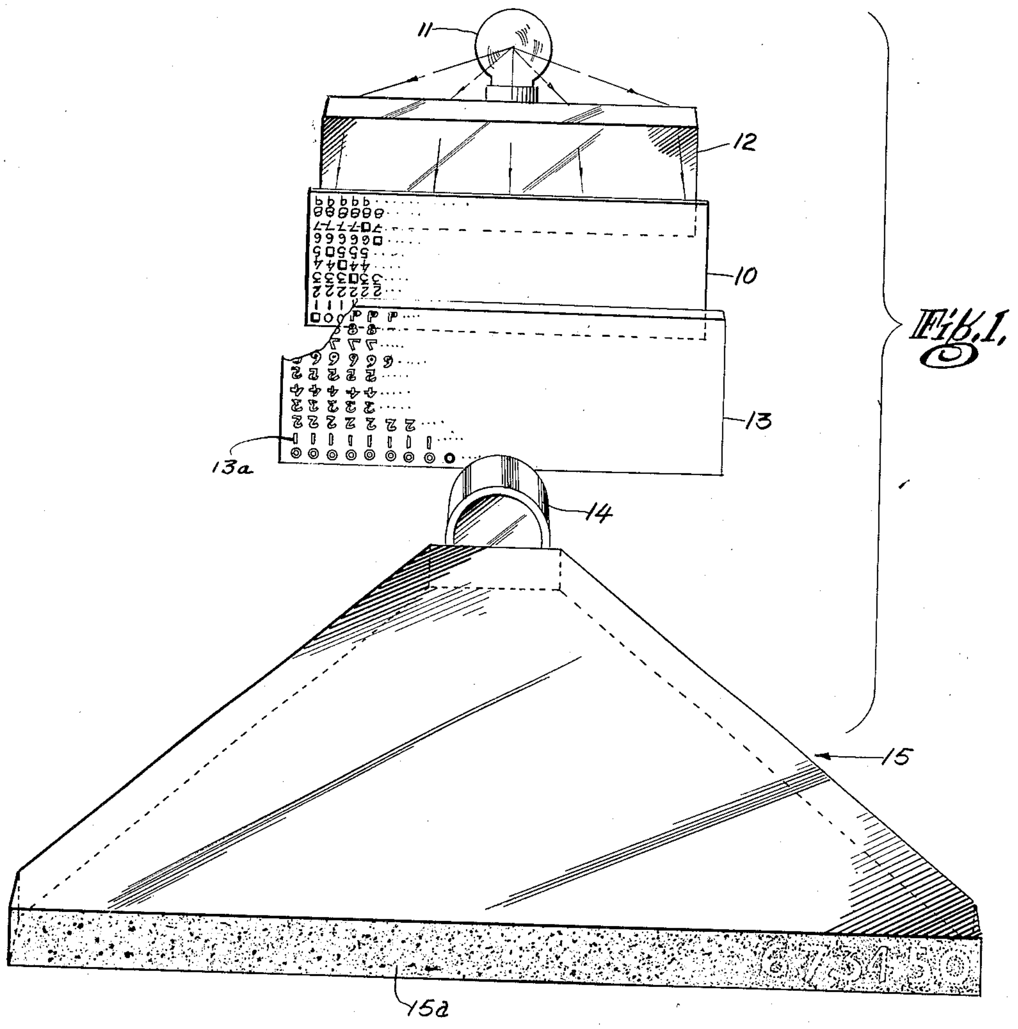

The device, of which the essential features only are shown in the drawings, is for use in reading or interpreting a data card such as that shown inverted at 10 in Fig. 1. Such a card has a useful surface made up of elemental areas arranged in vertical and horizontal rows and carrying data characters, which are all alike in respective horizontal rows and all different from one another in each vertical row. The characters on the card illustrated are numerals and each vertical row contains the numerals from 0 at the top to 9 at the bottom. The card is shown as having holes punched at such spots that the holes denote the number 673450.

The new reading device comprises a source of light 11, which may be an incandescent bulb, and a light condenser 12, which lies in front of the source and may be of the Fresnel lens type. The card 10 is to be placed in front of the lens 12 and between the lens and a font plate 13, which is opaque, except for the transparent characters 13*a* thereon, though alternatively the characters could be opaque and the plate transparent. The characters occupy the same relative positions on the plate as the data areas on the card, that is, the characters on the plate are arranged in vertical and horizontal rows and at the same spacing as the areas. The characters on the plate denote data on corresponding areas on the card and are, accordingly, numerals, which run from 0 to 9 in the vertical rows and are all alike in the respective horizontal rows. As the card is to be held inverted when read, the characters on the plate 13 are arranged with 0 at the bottom and the 9 at the top of each row.

The device includes a projection lens 14, which lies in front of the plate 13 and may be of the double meniscus type. The lens acts to image the characters on plate 13 upon a flat focal plane and, if used alone, would produce an array of images of all the characters on plate 13. Since any card to be read has only a single hole punched in each vertical row of data areas and the images of the characters corresponding to the holes should be formed in a horizontal line for ease in reading, a reflecting device is disposed in front of the lens to cause the images of the illuminated characters to lie in a horizontal row on the screen. The viewing screen may be the front ground surface 15*a* of an optical element 15, which has flat horizontal top and bottom surfaces 15*b*, 15*c* serving as reflecting surfaces. The rear surface 15*d* of the element lies parallel to the front surface 15*a* and close to the lens and the height or thickness of the element is approximately equal to the aperture of the lens, so that all of the light issuing from the lens enters the element. The element 15 may be comprised of several components having plane surfaces, a single prism having comparable surfaces, or a modified prism of trancated wedge form with side surfaces 15*e*, 15*f* lying at an angle to each other, which may be somewhat less than the field angle of lens 14.

Figure 2:
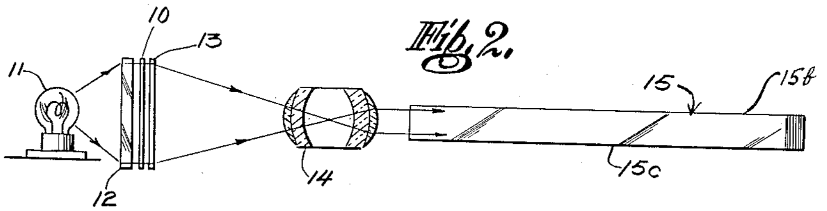
Fig. 2 is a longitudinal vertical section through the device.

In the use of the device, the punched card to be read is placed upside down between the condenser 12 and the font plate 13. In the actual device, the condenser and plate lie close together, as shown diagrammatically in Fig. 2, but a support for the card may be provided, if desired. When the source 11 is turned on, light passing through the holes in the card illuminates the characters on the plate 13 in alignment with the holes and the beams from the illuminated characters enter the lens 14 and are directed thereby into the optical element 15 through its rear end surface. In passing through the element to its front surface, the beams from characters, which lie in horizontal rows above and below the axis of the lens, undergo reflection by the top and bottom surfaces 15*b*, 15*c* of the element 15 in such manner that all of the images of the characters appear in a single horizontal row on the screen 15*a*.

Figures 3, 4, 5:
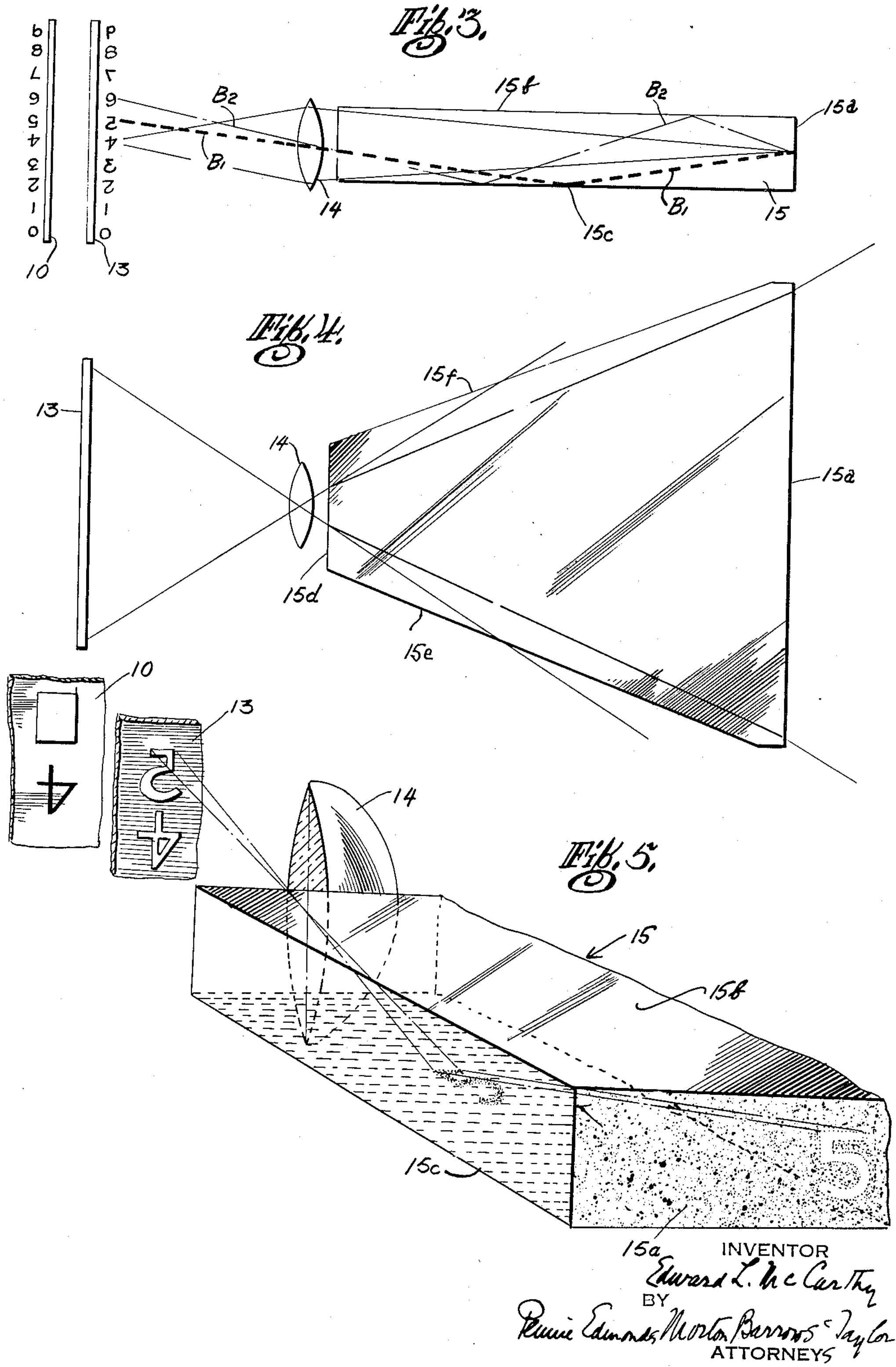
Fig. 3 is a diagrammatic view illustrating the classes of characters and the reflections thereof.
Fig. 4 is a diagrammatic plan view.
Fig. 5 is a diagrammatic perspective view showing the nature of the reflections of the symbols in the device.

The number of reflections, to which the beam through a particular character is subjected, depends on the position of that character with reference to a horizontal plane through the lens axis, as illustrated diagrammatically in Fig. 3. In this view, the character 4 lies in a horizontal row through the axis of lens 14 and the beam from that character and all other characters in the same horizontal row pass through the element 15 to the screen 15*a* without reflection. These characters are, accordingly, inverted on the font plate, so that their images on the screen will be erect. The character 5 lies in the horizontal row next above the row in the horizontal plane through the lens axis. Accordingly, the beam $B_1$ through character 5 enters the element 15 at an angle and, as shown in Fig. 5, is reflected once from the bottom surface 15*c* of element 15 before being imaged on the screen 15*a*. In order that an erect image of the character may appear on the screen, it is necessary that the character be reversed on plate 13 and all characters, whose beams thus undergo an odd number of reflections in the optical element 15 must appear reversed on plate 13 for the same reason. The beam $B_2$ through any character 6 in the horizontal row second above the horizontal plane through the axis of the lens undergoes two reflections in the element 15, the beam first striking the bottom surface 15*c* and being reflected therefrom to the top surface 15*b*, from which the beam passes to the screen 15*a*. When the beam through any character thus suffers two or any other even number of reflections, the character on plate 13 must be inverted in order that its image will be upright on the screen.

It will be apparent that the beam passing through a character in a horizontal row on plate 13 lying below the horizontal row through the axis of lens 14 will undergo the same number of reflections in element 15 as the beam passing through a character in a corresponding row above the horizontal axial plane. Accordingly, in the preparation of the plate 13, the characters thereon, which lie in horizontal rows such that the beam through any character undergoes no reflection or an even number of reflections in element 15, must be inverted, while the symbols in the other rows must be reversed. The font plate thus carries two classes of characters, namely, inverted and reversed.

I claim:

1. A device for reading a card carrying data indicated by holes in the card in selected areas in a plurality of vertical and horizontal rows, which comprises a source of light, a plate lying in the path of light from the source and having characters occupying the same relative positions on the plate as the data areas on the card and denoting data at the corresponding areas, an optical element having a front surface adapted to act as a viewing screen and spaced flat parallel horizontal surfaces to the rear of the front surface, and a lens for directing beams of light received through the plate into the element and imaging the characters upon the screen, the beams from horizontal rows offset above and below the lens axis being reflected by said horizontal surfaces on the element so that all the images of characters lie in a horizontal line on the screen.

2. A device for reading a card carrying data indicated by holes in the card in selected areas in a plurality of vertical and horizontal rows, which comprises a source of light, a plate lying in the path of light from the source and having characters occupying the same relative positions on the plate as the data areas on the card and denoting data at the corresponding areas, an optical element having substantially parallel front and rear vertical surfaces, the front surface being adapted to act as a viewing screen, and spaced flat parallel horizontal top and bottom surfaces, and a lens for directing beams of light received through the characters into the element through its rear surface and imaging the characters upon the front surface of the element, the beams through horizontal rows offset above and below the lens axis being reflected by the top and bottom surfaces of the element so that all the images of characters lie in a horizontal line.

3. A device for reading a card carrying data indicated by holes in the card in selected areas in a plurality of vertical and horizontal rows, which comprises a source of light, a plate lying in the path of light from the source and having characters occupying the same relative positions on the plate as the data areas on the card and denoting data at the corresponding areas, an optical element having substantially parallel front and rear vertical surfaces, spaced flat parallel horizontal top and bottom surfaces, the front surface being adapted to act as a viewing screen, and a lens for directing beams of light received through the plate into the element through its rear surface and imaging the characters upon the front surface of the element, the beams through horizontal rows on the plate offset above and below the lens axis being reflected by the top and bottom surfaces of the element so that all the images of characters will lie in a horizontal row on the screen, the rear end surface of the element having a width in a horizontal plane at least equivalent to the aperture of the lens and the screen having a width in a horizontal plane at least sufficient to cover the field angle of the lens.

4. An optical device for translating punched card data information into a horizontal line of characters comprising a source of light, a plate lying in the path of light from the source and having characters occupying the same relative positions on the plate as data areas on the card and denoting data at the corresponding areas, a lens positioned to receive beams of light through the plate for focusing the illuminated characters in the plane of said horizontal line of characters, and an optical element having its axis aligned with a central data area, said optical element including two opposed reflective plane surfaces disposed in parallel horizontal relation for receiving the illuminated images from said lens, and a translucent vertical surface positioned in the focal plane of said lens, whereby said illuminated characters are imaged upon said translucent surface in a horizontal line by a number of reflections through said optical element dependent upon the initial vertical displacement of each said illuminated character from a central data area.

5. An optical device for translating punched card data information by vertical and horizontal rows into a horizontal line of characters, comprising a source of light, a plate lying in the path of light from the source and having characters occupying the same relative positions on the plate as data areas on the card and denoting data at the corresponding areas, a lens positioned to receive beams of light through the plate for focusing the illuminated characters in the plane of said horizontal line, and an optical element having its axis aligned with a central data area, said element comprising two horizontally parallel mirrors and a translucent surface positioned substantially parallel to said plate at said focal plane, whereby said illuminated characters are imaged upon said translucent surface in a horizontal line by a number of reflections through said optical element dependent upon the initial vertical displacement of each said illuminated character from a central data area.

6. An optical device for translating punched card data information into a horizontal line of characters comprising a source of light, a plate lying in the path of light from the source and having characters occupying the same relative positions on the plate as the data areas on the card and denoting data at the corresponding areas, a lens positioned to receive beams of light through the plate for focusing the illuminated characters in the plane of said horizontal line, and an optical element having its axis aligned with a central data area, said element comprising a prism having two horizontally parallel internally reflective surfaces and a translucent surface positioned in the focal plane of said lens, whereby said illuminated characters are imaged upon said translucent surface in a horizontal line by a number of reflections through said optical element dependent upon the initial vertical displacement of each said illuminated character from a central data area.

References Cited in the file of this patent

UNITED STATES PATENTS

| | | |
|---|---|---|
| 1,751,584 | Hansell | Mar. 25, 1930 |
| 1,880,414 | Capstaff | Oct. 4, 1932 |
| 1,935,070 | Walther | Nov. 14, 1933 |
| 1,977,120 | Dirkes et al. | Oct. 16, 1934 |
| 2,295,000 | Morse | Sept. 8, 1942 |
| 2,323,372 | Bryce | July 6, 1943 |
| 2,354,591 | Goldsmith | July 25, 1944 |
| 2,357,593 | Leavell | Sept. 5, 1944 |
| 2,379,534 | Lowden | July 3, 1945 |
| 2,471,800 | Von Mulinen | May 31, 1949 |
| 2,488,955 | Wood | Nov. 22, 1949 |
| 2,638,031 | Stockwell | May 12, 1953 |